US012626173B2

(12) United States Patent (10) Patent No.: US 12,626,173 B2

Reilly et al. (45) Date of Patent: May 12, 2026

---

(54) DEVICE AND METHOD FOR CONTINUOUS TIME QUANTUM COMPUTING

(71) Applicant: Second Foundation, Inc., Cambridge, MA (US)

(72) Inventors: Michele Reilly, Vienna (AT); Seth Lloyd, Cambridge, MA (US)

(73) Assignee: Second Foundation, Inc.

( * ) Notice: Subject to any disclaimer, the term of this patent is extended or adjusted under 35 U.S.C. 154(b) by 613 days.

(21) Appl. No.: 18/247,456

(22) PCT Filed: Mar. 10, 2022

(86) PCT No.: PCT/EP2022/056176
§ 371 (c)(1),
(2) Date: Mar. 31, 2023

(87) PCT Pub. No.: WO2023/169679
PCT Pub. Date: Sep. 14, 2023

(65) Prior Publication Data
US 2024/0362514 A1 Oct. 31, 2024

(51) Int. Cl.
*G06N 10/20* (2022.01)
*G06N 10/40* (2022.01)

(52) U.S. Cl.
CPC ............. *G06N 10/20* (2022.01); *G06N 10/40* (2022.01)

(58) Field of Classification Search
None
See application file for complete search history.

(56) References Cited

U.S. PATENT DOCUMENTS

2022/0012622 A1* 1/2022 Niu ........................... H03K 3/38
2022/0207402 A1* 6/2022 Lechner ................. G06N 10/40
(Continued)

OTHER PUBLICATIONS

Yin Mo, Giulio Chiribella, "Quantum-enhanced learning of rotations about an unknown direction", New Journal of Physics 21, 113003 (2019), https://doi.org/10.48550/arXiv.1906.01300 (Year: 2019).*

*Primary Examiner* — Mehmet Yesildag
(74) *Attorney, Agent, or Firm* — The Belles Group, P.C.

(57) ABSTRACT

The present disclosure relates to quantum computing methods and devices, wherein a computation corresponding to a certain desired unitary transformation of the Hilbert space of a quantum system, such as a set of qubits, is implemented by selective application of control pulses in order realize a continuous time quantum computation rather than by decomposing the unitary transformation into a sequence of gates taken from a fixed set of gates. In this way an effective Hamiltonian having an input matrix A encoded as an off-diagonal block connecting a first and a second subspace of the quantum system is then applied alternatingly with some standard Hamiltonian in order to obtain a time evolution corresponding to a given function f applied to the input matrix A. The required control pulses are optimized by means of classical compression techniques such as a deep learning neural network, in order to maximize, during the information loading phase of the computation, the amount of classical information loaded into the system, and, during the computational phase, the number of elementary continuous time quantum transformations, respectively.

4 Claims, 2 Drawing Sheets

(56)                    References Cited

U.S. PATENT DOCUMENTS

| | | | |
|---|---|---|---|
| 2023/0368064 A1* | 11/2023 | O'Brien | G06N 10/40 |
| 2024/0378480 A1* | 11/2024 | Lechner | G06N 10/60 |
| 2025/0028783 A1* | 1/2025 | Babbush | G06F 30/20 |
| 2025/0156498 A1* | 5/2025 | Ender | G06N 5/01 |

* cited by examiner

Procedure HQSVT

▷ inputs:

A: $D_1 \times D_2$ matrix w. SVD $A = \sum\limits_{j=1}^{J} \Gamma_j |\ell><r_i|$ f(.): function L: positive inleger $\{|\ell_i>\}$ : left singular vectors $\{|r_j>\}$ : right singular vectors ▷ definitions:

$H_{eff} := \begin{pmatrix} 0 & A \\ A^+ & 0 \end{pmatrix}$ } 1st subspace $\varphi_1$, dim = $D_1$
} 2nd subspace $\varphi_1$, dim = $D_2$ $Z := \begin{pmatrix} I_1 & 0 \\ 0 & -I_2 \end{pmatrix}$ } $\varphi_1$
} $\varphi_2$ $I_1 := \sum\limits_{j=1}^{J} |\ell_j><\ell_j|, \quad I_2 := \sum\limits_{j=1}^{J} |r_j><r_j|$ $G_\phi(t) := e^{i\phi z} e^{-iH_{eff}} e^{-i\phi z}$ $U\{t_e, \phi_e\}_{e=1...L} := G_{\phi_L}(t_L) \cdot G_{\phi_{L-1}}(t_{\ell-1}) \cdot ... \cdot G_{\phi_1}(t_1) \doteq \begin{pmatrix} U_{11} & U_{12} \\ U_{21} & U_{22} \end{pmatrix}$ $J(X, \{t_\ell, \phi_\ell\}) := \| X - U_{12}\{t_\ell, \phi_\ell\} \|$ ▷ goal: $U_{12} \stackrel{!}{=} f(A) + \varepsilon$, minimize $\varepsilon$ ▷ body:

• initialize ($s \cong 0$)

Generative Neural Network

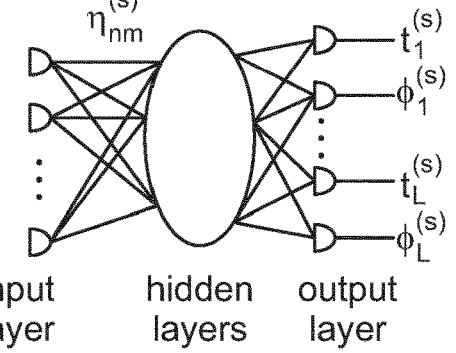

input layer      hidden layers      output layer (2L neurons)

• do until < stopping criterion = TRUE>

-update GNN weights $\{\eta_{nm}\}$ using gradient descent algorithm GD:

$$\left\{ \eta_{nm}^{(s+1)} \right\} = GD\left(J(f(A), \cdot), \{\eta_{nm}^{(s)}\}\right)$$

-increment:      s=s+1
end do

•return $\{t_\ell, \phi_\ell\}$ = output (GNN), $U\{t_\ell, \phi_\ell\}$, $\| U_{12}\{t_\ell, \phi_\ell\} - f(A) \|$

Fig. 2

DEVICE AND METHOD FOR CONTINUOUS TIME QUANTUM COMPUTING

CROSS-REFERENCE TO RELATED APPLICATION

This application is the United States national phase of International Application No. PCT/EP2022/056176 filed Mar. 10, 2022, the disclosure of which is hereby incorporated by reference in its entirety.

BACKGROUND OF THE INVENTION

Field of the Invention

The present disclosure relates to methods and devices for performing quantum computations.

Description of Related Art

A quantum computer is a device that processes information stored on quantum mechanical degrees of freedom, such as atoms, electrons, photons and superconducting qubits. Quantum information partakes in the strange and counterintuitive features of quantum mechanics: quantum bits can exist in superpositions of 0 and 1, and two or more quantum degrees of freedom can be entangled, exhibiting what Einstein called 'spooky action at a distance'. Quantum computers employ the strange and counterintuitive features of quantum mechanics to process information in ways that classical computers can't, thereby achieving substantial potential speedups over classical computers for a variety of problems.

Like nearly all modern classical computers, quantum computers are usually digital computers storing information in arrays of two state systems or qubits. With each qubit spanning a two dimensional Hilbert space, the total computational Hilbert space of an N-qubit register is $2^N$, which is the dimension of the product space of the Hilbert spaces of the individual qubits. While it is possible to also use three or more state systems, i.e. qutrits, ququads etc., in place or in addition to qubits, these offer at most practical but no fundamental benefits. It is also possible to perform quantum information processing on systems such as harmonic oscillators or modes of the electromagnetic field that possess continuous degrees of freedom.

Another analogy carried over from classical computers due to its conceptual simplicity is the use of gates, i.e. basic quantum operations on one, two or more qubits in the description of quantum processing operations to be performed in a quantum computer. Any pure quantum computation run on a quantum computer can be described by a global unitary operation on its computational Hilbert space. A quantum algorithm that achieves some quantum computational task, such as Grover's search algorithm, Shor's factorization algorithm or quantum Fourier transform, usually also includes preparation and measurement steps, but in between these projective operations a pure unitary evolution takes place. Just as any classical computation can be broken down into a sequence of basic logic operations or gates on the classical bits of a classical digital computer, it was established early during quantum computation research that any unitary operation can be arbitrarily closely realized by sequences of one- and two-qubit gates taken from a small set of gates acting on the qubits of the quantum computer.

This quantum circuit model has been in use since the inception of quantum computation and nearly all quantum computer concepts are based on it. Being carried over from classical digital computing, it has the benefit of easy adoption by those already working in the field, as well as being straightforward to learn for newcomers as it allows a LEGO®-like approach to thinking about computation. Most importantly, however, by its restriction to a finite and rather small set of basic operations, it allows straightforward proofs of the computational completeness of a particular quantum computing implementation (as one just needs to implement each gate of the basic set) as well as more easily proving theorems about completeness and optimality of algorithms.

The circuit model of quantum computation has, however, the downside of being, in general, far from resource optimal. Since all quantum information in a quantum computer is subject to some degree of decoherence and the quantum gates of a computer also have a certain failure probability, error correction techniques are far more important in quantum computing than in classical computing: whereas in the latter there is usually a large energy barrier separating two distinct states of a classical bit, even a small influence can change the state of a qubit, in case of the phase information even without costing any energy (if the computational basis states are also energy eigenstates of the native system Hamiltonian, as is usually the case). In circuit model quantum computing intricate error correction schemes have therefore been devised to cope with this problem. They all achieve this by using logical qubits encoded in multiple physical qubits, thereby adding redundancy such that a single or a small number of errors in the physical qubits does not compromise the stored logical quantum information.

Error correction adds a significant overhead. For current devices and depending on the architecture, it is required for computations using on the order of a thousand gates or more. However, even without error correction the circuit model is suboptimal, since the stringent adherence to realizing a certain ideal operation as precisely as possible is often not well suited to the quantum systems used to implement the quantum computer. Whether these are superconducting qubits, colour centers in crystals or trapped ions, there are usually interactions present, both internal with other qubits and external with the outside world, that, though possibly small, cannot be turned off completely or even sufficiently to be negligible and which cause both gate errors and decoherence.

Another known approach to quantum computation trying to make better use of the native properties of a quantum system is optimal control, which tries to implement a certain desired unitary operation directly by finding suitable control pulses. In any quantum computation architecture control of the quantum computer and its qubits is effected by means of time varying semi-classical control fields. For instance, in the case of superconducting qubits, these are radio-frequency (RF) pulses of certain frequency, polarization, duration, and amplitude and envelope/shape and (static or slowly varying) magnetic fields. In the case of colour centers one uses also Laser pulses in addition to RF pulses which are characterized by the same parameters.

The idea of optimal control is now to find a set of time varying control pulses that will, together with the inherent time evolution of the system, yield a certain desired overall unitary time evolution of the system, thus realizing a desired quantum computation. If the circuit model is likened to going from A to B by following only some limited number of prescribed roads and streets, optimal control is like taking a shortcut, ideally by flying across country, i.e. taking the shortest possible route.

The circuit model may still be used to figure out the desired unitary or, in the above analogy, the destination B, but it does not straightjacket the realization of that unitary. In that way, substantial improvements can be achieved, in particular the time taken for a computation can be reduced but also the size of a problem instance that can be handled on a given quantum computing hardware set, i.e. the memory/qubit requirements.

The published patent application US 2020/0410343 A1 proposes methods, systems and apparatus for designing a quantum control trajectory for implementing a quantum gate using quantum hardware where, in one aspect, a method includes actions of representing the quantum gate as a sequence of control actions and applying a reinforcement learning model to iteratively adjust each control action in the sequence such that the quantum control trajectory is implemented with minimal leakage, infidelity and total runtime to improve its robustness against control noise during the iterative adjustments.

In "Quantum singular value transformation and beyond: exponential improvements for quantum matrix arithmetics" first published under https://arxiv.org/pdf/1806.01838.pdf but more recently also in the Proceedings of the $51^{st}$ Annual ACM SIGACT Symposium on the Theory of Computing, p. 193-204 (2019), András Gilyén et al. have proposed a method that allows applying polynomial transformations to the singular values of a block of a unitary operator. However, this transformation was proposed to be realized by quantum circuits, albeit simple ones, and therefore suffers from the same aforedescribed disadvantages as all other gate based algorithms. Also, it remains unclear how in a method or a device for quantum computing this result can usefully be applied to linear algebraic operations with and on arbitrary input matrices.

SUMMARY OF THE INVENTION

Embodiments of the invention overcome these and other problems.

In particular is it an object of the invention to find quantum computing methods and devices to effect a desired unitary operation wherein, encoded in a matrix representation of that unitary in some computational basis, an arbitrary function of an input matrix as a block, for instance an off-diagonal block, appears.

Furthermore it is an object to provide methods and devices which allow efficient solution of linear equations as well as faster loading of classical data into a quantum computing device in order for that data to then be processed in a quantum computation.

In general, it is an object of the invention to find quantum computing devices and methods that offer a significant speed-up over known methods and devices based on quantum circuits and their implementations.

These objects are achieved by a quantum computation device as described herein and a corresponding method for performing a quantum computation as described herein.

The quantum computing device according to this invention comprises a quantum system providing a computational Hilbert space having a first subspace of dimension $D_1$ and a second subspace of dimension $D_2$, at least one control field generator capable of generating a number $K \geq 1$ of semi-classical control fields, wherein a time-dependent Hamiltonian H describing the time evolution at a time instant t in a time period T, applied to the quantum system is the sum of a native system Hamiltonian $H_0$ and a control Hamiltonian $H_c$ depending on the K control fields via $$H_c = \sum_{k=1}^{K} \lambda_k(t) H_k,$$

and a classical control system controlling the control field generator or generators and capable of varying each of the control fields in time at a control bandwidth W, wherein $2W = 1/\Delta t$.

The Hamiltonian of a quantum system is the i-multiple of the anti-hermitian operator describing the time evolution of the system for an infinitesimal time interval dt. In general, the Hamiltonian is time-dependent, but it can always be decomposed into a sum of time-independent hermitian operators each multiplied by a time-varying scalar field, that capture the time dependence of the Hamiltonian. Therefore, in the above equation for $H_c$, the individual control Hamiltonians $H_k$ may be assumed to be time independent.

Given an input matrix A of shape D1×D2 that is to be processed by a quantum computation running on the device, the classical control system is configured to alternatingly apply at least a first effective Hamiltonian and a second effective Hamiltonian. The first effective Hamiltonian is one in which the input matrix A is encoded as an off-diagonal block connecting a first and a distinct second subspace of the computational Hilbert space, with other blocks having the same row or column indices being arbitrary within the constraint that the overall Hamiltonian be hermitian. The dimension of the first subspace is $D_1$, that of the second subspace $D_2$. The first effective Hamiltonian thus has the matrix representation $$H_{eff} \stackrel{.}{=} \begin{pmatrix} * & A \\ A^\dagger & * \end{pmatrix}$$

in a computational basis of the first and second subspace. Such an effective Hamiltonian may for instance be obtained by the techniques described below.

The matrix representation of the second effective Hamiltonian has the form $$Z = I_1 - I_2$$

where $$I_1 = \sum_{j=1}^{J} |l_j\rangle\langle l_j|_1$$

and $$I_2 = \sum_{j=1}^{J} |r_j\rangle\langle r_j|_2$$

are projectors onto (subspaces of) the first and second subspace respectively which are each obtained by summing over the left singular vectors and right singular vectors respectively of the Singular Value Decomposition of the input matrix A, which is given by $$A = \sum_{j=1}^{J} \sigma_j |l_j\rangle\langle r_j|,$$

with the J non-zero singular values $\sigma_j$.

The second effective Hamiltonian $\dot{Z}$ may be obtained by employing the same techniques used to obtain the effective Hamiltonian $H_{eff}$, where as input matrix A the matrix of all 0s is used and the control parameters are furthermore chosen such that the on-diagonal blocks are identity matrices. The second effective Hamiltonian Z has the effect of inducing a phase rotation in two dimensional subspaces $\{|l_j\rangle |r_j\rangle\}$ spanned by each pair of left and right singular vectors. Here the right singular vectors belong to the first subspace and the left singular vectors to the second subspace.

In case the corresponding on-diagonal blocks of shape D1×D1 and D2×D2 respectively of the Hermitian matrix covering the same row and column indices respectively as A, is not zero, which means in nearly all practical cases, the second effective Hamiltonian is applied in order to average out/refocus the time evolution of the first subspace stemming from the non-zero on-diagonal blocks.

The classical control system of the quantum computing device according to the invention is configured to perform the three step process of (a) applying the second effective Hamiltonian Z for a first phase rotation time corresponding to a phase rotation by a first angle ($\phi$1), then (b) applying the first effective Hamiltonian $H_{eff}$ for a first time (t1), and then (c) applying again the second Hamiltonian Z for a phase rotation time corresponding to a phase rotation by the negative of the first angle (i.e. $-\phi$1) or applying the negative $-Z$ of the second Hamiltonian for the first phase rotation time.

The time evolution effected by carrying out these steps is described by the operator product $e^{-iG_{\phi_1}t_1} := e^{i\phi_1 Z} e^{-H_{eff}t_1} e^{-i\phi_1 Z}$ defining the effective operator $G_{\phi_1}$. In special cases carrying out these steps once might be enough to obtain the desired block-off diagonal time evolution $f(A)$. However, in general, this is not the case. Therefore, in preferred embodiments of the method according to the invention, the steps a-c are repeated with different settings of the parameters $\phi$ and t, i.e. with values ($\phi_2$,$t_2$), ($\phi_3$,$t_3$) and so on up to some positive integer L. Correspondingly, in preferred embodiments of the corresponding device, the classical control system is suitably configured to repeat the three steps a-c.

With the singular value decomposition of the input matrix $$A = \sum_{j=1}^{J} \sigma_j |l_j\rangle\langle r_j|$$

where the non-negative integer J denotes the number of non-zero singular values $\sigma_j$, and $|l_j\rangle$ and $\langle r_j|$ the left and right singular vectors of A respectively, the unitary time evolution resulting from such a sequence of L repetitions can in general be expressed as $$U = \bigoplus_{j=1}^{J} U_j$$

where each of the unitary components $U_j$ has the form $$U_j = \begin{pmatrix} P(\cos\sigma_j) & i\sin\sigma_j Q(\cos\sigma_j) \\ i\sin\sigma_j Q^*(\cos\sigma_j) & P^*(\cos\sigma_j) \end{pmatrix}$$

in the two dimensional subspace spanned by $|r_j\rangle \pm |l_j\rangle$ where P( ) and Q( ) are polynomials, P( ) having a degree less or equal to L and parity L mod 2 and Q( ) having a degree less or equal to L−1 and parity L−1 mod 2 and from the constraint that each $U_j$ be unitary it follows that $|P(\cos \sigma_j)|^2 + \sin^2 \sigma_j |Q(\cos \sigma_j)|^2 = 1$.

In order that U have, within an error $\varepsilon$, f(A) as off-diagonal block, the 2L parameters $\{(\phi_l,t_l)\}_{l=1 \ldots L}$ are, according to the invention, chosen such that $$\sin\sigma_j Q(\cos\sigma_j) = f(\sigma_j) + \varepsilon$$

or, setting $x_j := \cos \sigma_j$, equivalently $$\sqrt{1 - x_j^2}\, Q(x_j) = f(\cos^{-1} x_j) + \varepsilon.$$

That this is always possible follows from the fact that the function f( ) may be decomposed, to within the desired error $\varepsilon$, into Chebyshev polynomials of degree $$O\left(\log\frac{1}{\varepsilon}\right),$$

since these polynomials form a basis for the.

The parameters $\{(\phi_l,t_l)\}$ are preferably determined in an optimization step such that the transformation approximates the desired operator function f(A) as accurately as possible or at least to within the given error $\varepsilon$. To this end, in some embodiments of the invention a pre-computation or pre-processing is performed in order to find optimized values of the parameters $\{(\phi_j,t_j)\}$.

After the optimization, the unitary time evolution over the period T will then, within an error of at most $\varepsilon$, have the form $$U(0, T) \doteq i\begin{pmatrix} \sqrt{1 - A^\dagger A} & A^\dagger \\ A & -\sqrt{1 - AA^\dagger} \end{pmatrix}$$

in a computational basis of the first and second subspace.

An interesting special case is f(x)=x, and therefore f(A)=A. In this case, the input matrix A itself appears as off-diagonal block of the unitary time evolution as carried out by/in the quantum computing method and/or device. The method according to the invention therefore allows to apply an arbitrary matrix A to a subspace of a quantum system. If the state of the quantum system projected onto that subspace is for instance $(|\psi\rangle,0)$, the method of the invention allows computing the product $$A|\psi\rangle: U(|\psi\rangle, 0) = i(\sqrt{1 - A^\dagger A}\, |\psi\rangle, A|\psi\rangle).$$

If A is square, arbitrary powers of A may be obtained by alternating the application of U with the operation S defined by $$S(|v\rangle, |\psi\rangle) = (|\psi\rangle, 0)$$

After n repetitions the state $A^n|\psi\rangle$ may be obtained:

$$(SU)^n(|\psi\rangle, 0) = i^n\left(\sqrt{1 - A^\dagger A}\, A^{n-1}|\psi\rangle, A^n|\psi\rangle\right).$$

The operation S may be implemented by the help of the method of the invention where the off-diagonal block is the identity matrix.

Another very interesting application of the method according to this invention is in solving linear equations of the form Ax=b for some given matrix A and vector b. Choosing the parameters $\{(\phi_l, t_l)\}$ such that the function $f(x)=1/x$ is implemented to desired accuracy $\varepsilon$, we can use the method to obtain a time evolution U having, to within that error $\varepsilon$, as off-diagonal block the inverse $A^{-1}$ of the matrix A. Thereby we may compute the solution $x=A^{-1}b$ if we can first prepare the subspace of the quantum system the off-diagonal block is acting on in a state corresponding to the vector b. One way of achieving this, is to encode the matrix $B^{-1}:=(b,*)$ having the vector b as first column with the remaining columns arbitrary into the effective Hamiltonian using the method described below, then apply the method according to this disclosure to obtain a unitary with B as off-diagonal block and then apply this to the initial state $|\psi\rangle = |1\rangle$, denoting the first state in the first subspace in some computational basis, which is assumed to be able to be prepared easily.

In order to carry out the method according to the invention, the quantum computing device needs to be able to generate an effective Hamiltonian where the input matrix A is encoded as an off-diagonal block. To do this, preferably the method described in the following paragraphs is used.

The effective Hamiltonians Heff and Z may be obtained by a suitable configuration of the classical control system. For instance, the classical control system may be configured to encode a given input matrix A of shape $D_1 \times D_2$, as an off-diagonal block of an effective Hamiltonian $H_{eff}$ describing the time evolution of the quantum system over the whole time period T by choosing the N control parameters $\lambda_{k,n}$ such that the sum of all monomials $\Delta t^m \lambda_{k_1,n_1} \ldots \lambda_{k_m,n_m} H_{k_1} \ldots H_{k_m}$ appearing in the expansion of the full time evolution $$U(T, 0) = e^{-iH(t_{M-1})\Delta t} \ldots e^{-iH(t_1)\Delta t}e^{-iH(t_0)\Delta t}$$

over the whole period $\{t_0=0,T\}$ for all orders m up to a highest order $l \geq m$ yields an effective Hamiltonian $H_{eff}$, $U(T,0)=:e^{-iH_{eff}T}$, having, in a computational basis of the first and second subspace (21, 22), the form $$H_{eff} \doteq \begin{pmatrix} * & A_{eff} \\ A_{eff}^\dagger & * \end{pmatrix}$$

where the off-diagonal block $A_{eff}$ is equal to the input matrix A to within an error e that decreases with the highest order I, where the first row and first column respectively refer to basis states belonging to the first subspace and the second row and the second column respectively refer to basis states belonging to the second subspace and "*" refers to arbitrary (hermitian) diagonal blocks, and wherein further the N control parameters $\lambda_{k,n}$ are determined by a preliminary computation using an optimization algorithm, and wherein the highest order/satisfies $1 \leq \log M/(1+\log K)$. The highest order I may further satisfy $(\log D_1 + \log D_2)/\log K \leq l$.

The latter of these constraints on l, which present disclosure has uncovered, comes from the fact that the number of monomials in the expansion, which is approximately equal to $K^l$, in general, but not necessarily, needs to be at least as great as the dimension of the matrix to be encoded, i.e. $K^l \geq D_1 D_2$. The former constraint reflects the requirement that in order to have sufficient control to give a desired value to all the monomial coefficients in the expansion, there have to be at least as many control parameters as there are monomials, i.e. $N=K$ $M \geq K^l$.

Finding the optimal values or at least values which yield an encoding of the input matrix A in the effective Hamiltonian $H_{eff}$ which is within a certain prescribed or desired error poses a highly non-linear optimization problem. To solve it, one can perform a preliminary computation using an optimization algorithm such as a gradient descent or an evolutionary algorithm or a combination of the two. The parameter values thus obtained are then used by the classical control system during the actual implementation of the method according to this aspect of the invention on the quantum system in order to generate the desired effective Hamiltonian $H_{eff}$ having the input matrix A as off-diagonal block. In the same way the operator Z defined above may be obtained with the only difference that only the two diagonal blocks of Z are non-zero. The control parameters leading to an effective Hamiltonian equal to Z within error $\varepsilon$ are otherwise determined by same optimization technique.

The preliminary computation may itself be performed on a quantum computer. However, this requires that the cost function to be optimized can be computed without encoding the input matrix A and might therefore be reserved to special problems or problem instances.

Alternatively a classical computer is used to perform the preliminary computation. This can be done efficiently, depending on the dimension $D_1$ $D_2$ of the input matrix A, if the control Hamiltonians describing the effect of the different control fields $H_1$, $H_2$, . . . , $H_K$, and consequently monomials $H_{k_1} \ldots H_{k_m}$ in the time evolution expansion, are sparse matrices and can be efficiently represented in a classical computer. This can usually be safely assumed if the quantum system is a composite system of several, well isolated subsystems, such as an array of qubits since in that case the control fields usually affect only of a small number of the subsystems, most often one or two.

The preliminary computation may involve using a neural network to determine the N control parameters $\lambda_{k,n}$. In some embodiments the desired monomial coefficients of the l-th order expansion or the elements of the matrix A itself are fed into the first or input layer of the neural network. In these embodiments the network may be trained to find suitable control parameters for different matrices A. Alternatively, a Generative Neural Network is used where the nodes/neurons of the input layer are fed some standard values. Here a different neural network is used for each problem instance, i.e. each different matrix A. In either case, the excitation of the last or output layer represent the control parameter settings. This implies that the output layer of the neural network contain at least N nodes.

Alternatively or additionally the preliminary computation involves a gradient descent carried out on the weights of the neural network. The fitness or cost function $J(\{\lambda_{k,m}\})$ to be minimized in this gradient descent can be a matrix norm applied to the difference of the input matrix A and the off-diagonal block $A(\{\lambda_{k,m}\})$ connecting the first and second subspace for the given control parameter settings:

$$J(\{\lambda_{k,m}\}) = \|A(\{\lambda_{k,m}\}) - A\|.$$

The preliminary computation can be performed by another computing device and at any time before the actual encoding the matrix A is to be carried out by the quantum computing method and device according to this first aspect of the invention. However, in some embodiments of the device and/or method of the first aspect, the preliminary computation is carried out by the classical control system of the quantum computing device itself. As stated before, the classical control system comprises classical information processing hardware controlling the control field generators according to, ultimately, user inputs. This information processing hardware may also be used to run the optimization algorithm employed in finding optimal or at least sufficiently accurate control parameter values. If the information processing hardware comprises a general purpose classical computer, this may be achieved simply by running appropriate software on that general purpose computer. Alternatively or additionally dedicated hardware designed or configured specifically to carry out the optimization algorithm may be used.

The ideas presented above may be realized in any quantum computing architecture employing registers of qubits. Specific quantum computing architectures that are contemplated and preferred by this disclosure are superconducting qubits, trapped ions and qubits, such as solid state qubits, placed in optical or microwave cavities (cavity QED) in order to utilize the coupling between the internal degrees of freedom of the qubit and the mode of the cavity (qumode).

Further preferred embodiments of the quantum computing devices and methods of this disclosure will be described in the following. The skilled person will appreciate that features of these embodiments may be freely combined as long as there is no contradiction.

The quantum system that provides the computational Hilbert space for performing a quantum computation may be any quantum system controllable with a sufficient degree of accuracy and precision. It may, for instance, be a d-level system, such as a quantum well, a crystal defect or a trapped ion. Alternatively or additionally the quantum system may comprise of a plurality of subquantum systems, such as a plurality of d-level systems or a plurality of qubits (d=2).

Depending on the quantum system to be controlled, the control field generators may comprise one or more RF pulse generators able to emit radio frequency pulses of desired shape, frequency (including chirp) and polarization. Alternatively one or more lasers can be used to control quantum systems the energy spectrum of which has transitions in the optical, UV or IR ranges of the electromagnetic spectrum. Control parameters of a laser include polarization, amplitude/pulse shape and, for some lasers, also frequency.

Other possible control fields are electrodes for generating static or quasi-static electric fields or magnetic coils, such as wire loops or solenoids, for generating static or quasi static magnetic fields. Quasi-static fields are time varying fields where the relative change is small on the time scales of the respective quantum system to be controlled.

The classical control system may comprise a classical general purpose computer running a suitable control software. Alternatively or in addition it may also comprise or even consist entirely of purpose built hardware into which the control routines and algorithms are hard-wired. The advantage over the general purpose computer with software combination is decreased processing time and thus increased reaction and control speed.

The features explained in conjunction with one of the quantum computing devices of the invention likewise apply to the corresponding method, and vice versa.

BRIEF DESCRIPTION OF THE DRAWINGS

FIG. 2: An illustration in the form of a pseudo-code procedure of a preferred embodiment of the Hamiltonian Quantum Singular Value Transformation method according to the invention.

DESCRIPTION OF THE INVENTION

Figure 1:
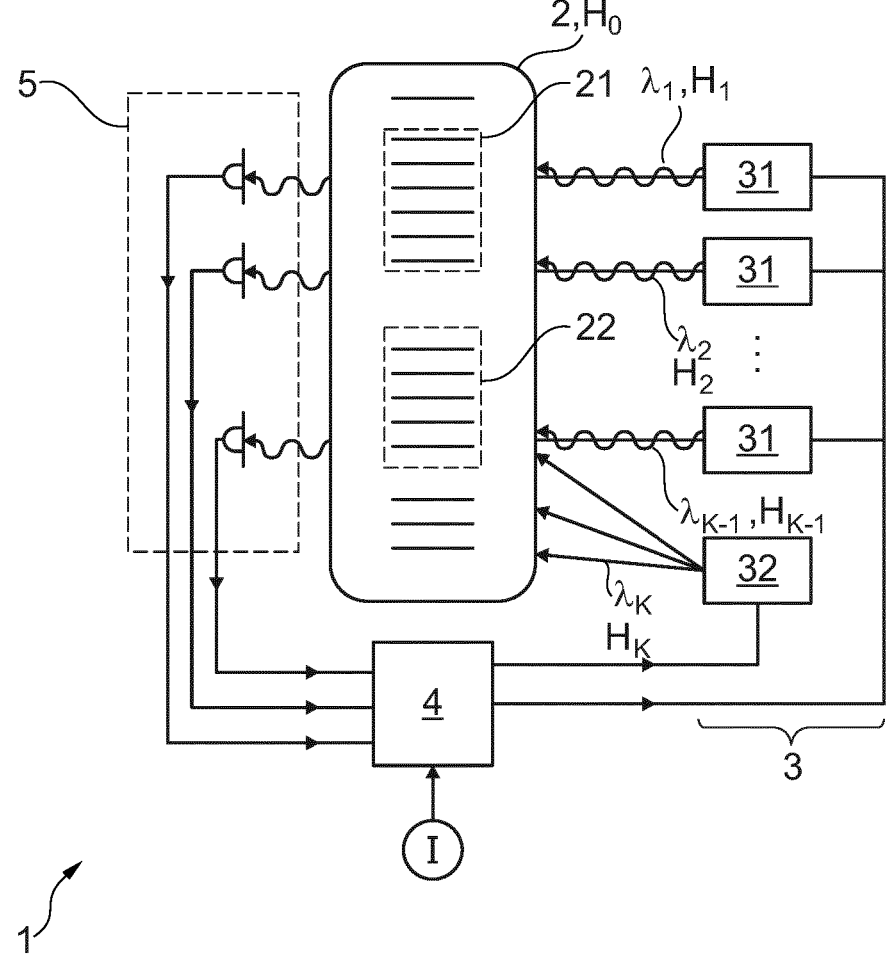
FIG. 1: A schematic illustration of a generic quantum computing device according to the invention.

In the following, illustrative embodiments of the device and the method for performing quantum computing according to this invention are presented. In the figures, the like reference numerals denote features of like or corresponding function or meaning.

FIG. 1 illustrates schematically the principal components of a quantum computing devices according to the invention.

At the heart of the quantum computing device 1 lies the quantum system 2, which may for instance be a register of qubits, such as a number of trapped ions, superconducting qubits or solid state qubits. The quantum system 2's inherent time evolution, i.e. it's time evolution in the absence of further control fields is governed by the Hamiltonian $H_0$. In order to perform a quantum computation, a degree of control is necessary, which is effected by means of a number K of control field generators 3, 31, 32 each generating a control field which may be described semi classically as a scalar time dependent function $\lambda_k(t)$ coupled to a corresponding control Hamiltonian $H_k$. Some control field generators 31 may each affect only one or a few subsystems of the quantum system 2, other control field generators 32 may affect several or the entire quantum system 2 at once. In the Hilbert space of the quantum system 2, illustrated by the irregularly spaced energy levels, two disjoint subspaces 21, 22 may be identified. The goal of the invention is to encode a function $f(\cdot)$ applied to an arbitrary input matrix A as an off-diagonal block of the time evolution operator describing the time evolution of the system for some period, the off-diagonal block connecting the first subspace 21 with the second subspace 22.

A classical control system 4 controls the control field generators according to some user input I as well as, in general measurement results obtained by detectors 5.

FIG. 2 illustrates a preferred embodiment of the Hamiltonian Quantum Singular Value Transformation method which may be used in a quantum computing device according to the invention in the form of a pseudo-code procedure "HQSVT".

Among the inputs to this procedure is some matrix A of shape $D_1 \times D_2$. Further, the procedure takes a function $f(\cdot)$, which is to be applied to the matrix A. It further takes a positive integer L corresponding to the length of the control sequence used in building up the desired unitary having f(A) as off-diagonal block connecting a first and a second subspace of the Hilbert space of the quantum system.

The procedure furthermore makes use of the Singular Value Decomposition of the matrix A, i.e.

$$A = \sum_{j=1}^{J} \sigma_j |l_j\rangle\langle r_j|$$

where $\sigma_j$ are the non-zero singular values, J is number of such values, and $|l_j\rangle$ and $|r_j\rangle$ respectively denote the left and right singular vectors. The procedure may be handed the SVD of A or it may compute it itself or by calling a further subroutine. If the left and right singular vectors are given as elements of $\mathbb{C}^{D_1}$ and $\mathbb{C}^{D_2}$ respectively, the trivial embedding in the first and second subspace respectively may be used, where the vector elements are simply interpreted as the amplitudes of the computational basis states.

In this case the computational basis may be chosen such that a native time evolution of the quantum system is already as close as possible to producing the desired effective Hamiltonian $H_{eff}$, which, as shown in the figure, has the matrix A as off-diagonal block connecting the first and second subspace and has vanishing diagonal blocks. Such an effective Hamiltonian may, for instance, be obtained by help of the method for obtaining arbitrary effective Hamiltonians described above.

If the raw effective Hamiltonian $$H_{eff}^0$$

obtained in this way has non-zero on-diagonal blocks, they may made to vanish by applying $$\pm H_{eff}^0$$

alternatingly with operator $\pm Z$, as defined in the figure $Z := \sum_{j=1}^{J}(|l_j\rangle\langle l_j|_1 - |r_j\rangle\langle r_j|_2)$ where the projectors $|l_j\rangle\langle l_j|_1$ and $|r_j\rangle\langle r_j|_2$ project onto the first and second subspace respectively, with J being the number of non-zero singular values of A. In this way it is possible to average out/refocus (the effect of) any on-diagonal blocks of the raw Hamiltonian $H_{eff}^0$ and thus obtain an effective Hamiltonian $H_{eff}$ with vanishing diagonal blocks as shown in the figure.

The operator Z, which acts as a Pauli-Z-operator in two dimensional subspaces spanned by $\{|l_j\rangle_1, |r_j\rangle_2\}$, also enters in the transformation that forms the basic building block of the pulse sequences used to approximate the desired unitary U having f(A) as off-diagonal block. As shown in FIG. 2, $G_\phi(t)$ is given by a pulse sequence of an application of $H_{eff}$ for a first time t sandwiched between two applications of Z, once corresponding to an angle $\phi$ and once to an angle $-\phi$. When implementing a pulse sequence found in a precomputation on a quantum computing device according to the invention a rotation by $-\phi$ may be achieved either by applying Z for a second time corresponding to a rotation by the angle $\phi$ and for a third time corresponding to an angle $2\pi-\phi \equiv -\phi$. Alternatively, the operator $-Z$ may be applied for the second time.

A unitary time evolution U is then constructed as a sequence of L applications of $G_\phi(t)$ for different parameters $t_l$, $\phi_l$, $l=1 \ldots L$. The set of 2L parameters $\{t_l,\phi_l\}_{l=1 \ldots L}$ is the subject of the subsequent optimization that uses the cost function $J(X,\{t_l,\phi_l\}_{l=1 \ldots L}) := \|X - U_{12}\{t_l,\phi_l\}_{l=1 \ldots L}\|$ where $U_{12}\{t_l,\phi_l\}_{l=1 \ldots L}$ is the off-diagonal block of U mapping vectors from the second to the first subspace. For the matrix X, f(A) is handed to J, thus it may also be defined as $J\{t_l,\phi_l\} := \|f(A) - U_{12}\{t_l,\phi_l\}\|$. The unitary U can be thought of as a subroutine to the procedure "HQSVT" which will be called repeatedly in the course of the optimization order to obtain the effective time evolution of a certain choice of values for the parameters $\{t_l,\phi_l\}_{l=1 \ldots L}$.

These parameters are then optimized in order to obtain a unitary with an off-diagonal block that is as close as necessary and/or prescribed to the desired form with the off-diagonal block f(A). In this optimization, a Generative Neural Network is used. As illustrated in FIG. 2, in step s=0, a suitable GNN is initialized, before a do-loop performing a gradient descent on the weights $\eta_{nm}$ is entered and not left until a stopping criterion becomes TRUE. Here "suitable" means that the number of nodes in the input and hidden layers, and thus the number of weights $\eta_{nm}$ be sufficiently high and that the number of nodes in the output layer be (at least) 2L, such that each output weight may be interpreted as the value of one of the parameters $\{t_l,\phi_l\}_{l=1 \ldots L}$.

The steps that are, potentially, repeated many times, in the do loop comprise a call to a gradient descent algorithm which takes the cost function J and the current set of weights $$\eta_{nm}^{(s)}$$

and returns updated weights $$\eta_{nm}^{(s+1)},$$

as well as incrementing the step counter s.

Useful stopping criteria comprise the actual error dropping below a desired error threshold, the step counter s reaching or exceeding a chosen maximum number of optimization steps, a computation time exceeding a preset time limit or any combination of these In addition to the basic procedure illustrated in the figure and in case the gradient descent algorithm is not guaranteed to always improve the error, such as if it includes random jumps for escaping from (only) local optima, one may also introduce a variable and suitable checks to store the best set of control parameters encountered so far and return these instead of or in addition to the set of control parameters reached in the final step.

After the do-loop has been left, the parameters $\{t_l,\phi_l\}_{l=1 \ldots L}$ of the final step s or the step, in which the lowest error has been encountered or both are returned. Alternatively or additionally the time evolution $U\{t_l,\phi_l\}_{l=1 \ldots L}$ obtained using these parameters and/or the error $J\{t_l,\phi_l\}_{l=1 \ldots L}$ may also be returned.

In some embodiments, the procedure "HQSVT" may further take a time scale parameter T denoting the desired duration of the pulse sequence yielding the effective unitary U. This may then be interpreted/enforced in different ways. It might be interpreted as a strict upper bound. It then follows that no control sequence within that time can be found, the procedure will exit without returning a result. It may also be interpreted as simply a starting value for an initial sequence, i.e. as the sum of the initial values of the individual steps, $$\sum_{i=1}^{L} t_i^{(s=0)} = T.$$

Also, the procedure could be handed a target/desired accuracy co additionally or instead of the parameter L. In that case, the number L would be determined by/within the procedure itself such that this desired accuracy is achieved, e.g. by starting from some low default value, e.g. L=1, and successfully increasing L until a solution having the target or better accuracy is found. Since the target accuracy might, in fact, not be attainable at all (insufficient control) or not be attainable with reasonable/allowed values of the control parameters, or might not be attainable for numerical reasons, alternatively or in addition, a target computation time and/or a maximum value for L and/or a maximum number of times that L may be incremented may also be handed over in order to ensure execution of the procedure finishes eventually.

Numerical experiments done by the inventors have shown that the gradient descent on the weights of a GNN is a surprisingly effective and also efficient method to generate good control sequences, i.e. once that yield the desired off-diagonal block A with high accuracy.

Applications of the "HQSVT" procedure described above as well as the Hamiltonian Quantum Singular Value Transformation according to the invention in general are fast matrix inversion allowing the efficient solution of linear equations, linear and nonlinear differential equations on high dimensional spaces as well as constrained quadratic optimization. Industrial applications are all those, where the aforedescribed mathematical applications appear. To name just a few these are in particular modelling of industrial processes, trajectory optimization for self-driving cars and inverse methods for oil and gas exploration.

Although the embodiments of the present disclosure have been described with reference to preferred embodiments, workers skilled in the art will recognize that changes may be made in form and detail without departing from the spirit and scope of the present disclosure.

LIST OF REFERENCE CHARACTERS

1 quantum computing device
2 quantum system
3 control field generators
31 local control field generator
32 global control field generator
4 classical control system
5 detectors
I user input
$H_0$ native Hamiltonian of 2
$\lambda_{1 \ldots K}$ time dependent control fields
$H_{1 \ldots K}$ time independent control Hamiltonians

The invention claimed is:

1. A quantum computing device, comprising:
a quantum system providing a computational Hilbert space having a first subspace of dimension $D_1$ and a second subspace of dimension $D_2$,
a number $K \geq 1$ of control field generators, each control field generator capable of generating a semi-classical control field, wherein a Hamiltonian applied to the quantum system depends on the control fields, and a classical control system controlling the control field generators, wherein the classical control system is able to:
by means of a first sequence of control field settings, apply to the quantum system a first effective Hamiltonian ($H_{eff}$) having, in computational bases of the first and second subspace, a matrix representation with an off-diagonal block corresponding to an input matrix A of shape $D_1 \times D_2$ having a singular value decomposition $$A = \sum_{j=1}^{J} \sigma_j |l_j\rangle\langle r_j|$$

with a number J of non-zero singular values $\sigma_j$, left singular vectors $|l_j\rangle$ from the first subspace and right singular vectors $\langle r_j|$ from the second subspace, and
by means of a second sequence of control field settings, apply to the quantum system a second effective Hamiltonian having a matrix representation of the form $$Z = I_1 - I_2 \text{ where } I_1 = \sum_{j=1}^{J} |l_j\rangle\langle l_j|_1$$

and $$I_2 = \sum_{j=1}^{J} |r_j\rangle\langle r_j|_1,$$

such that the second effective Hamiltonian (Z) induces a phase rotation in two dimensional subspaces spanned by two computational Hilbert space vectors, where one of the vectors is taken from the first subspace and the other is taken from the second subspace, wherein, in order to obtain unitary evolution of the quantum system having, in a matrix representation in the computational bases of the first and second subspace, an off-diagonal block corresponding to a given function f (A) of the input matrix A, the classical control system is configured to perform the steps:
(a) apply the second effective Hamiltonian for a first phase rotation time corresponding to a phase rotation by a first angle ($\Phi_1$), then
(b) apply the first effective Hamiltonian for a first time ($t_1$), and then
(c) apply again the second effective Hamiltonian for a phase rotation time corresponding to a phase rotation by the negative of the first angle or apply the negative of the second effective Hamiltonian for the first phase rotation time, thereby effecting a unitary transformation $e^{-iG\Phi_1 t_1} := e^{i\Phi_1 Z} e^{-i H_{eff} t_1} e^{-i\Phi_1 Z}$,
wherein the classical control system is further configured to repeat the steps a-c for a second, third and so on up to a L-th angle $\Phi_L$ and a second, third and so on up to a L-th time $t_L$ thereby effecting a unitary transformation $U_{HOSVT} = e^{-iG\Phi_L t_L} e^{-iG\Phi_{L-1} t_{L-1}} \ldots e^{-iG\Phi_1 t_1}$,
a classical preprocessing system that carries out an optimization of the first, second third and so on rotation angles $\Phi_L$ and times $t_L$, wherein the classical preprocessing system comprises a neural network, in particular a generative neural network, wherein the optimization involves a gradient descent on weights of the neural network, wherein the optimization involves feeding the function f(A) or its singular value decomposition to an input layer of the neural network.

2. The device of claim 1, wherein the preprocessing system is comprised in the classical control system.

3. A method for performing quantum computation in a quantum computing device, the method comprising comprising:

providing, by a quantum system, a computational Hilbert space having a first subspace of dimension $D_1$ and a second subspace of dimension $D_2$, generating, by at least one control field generator, a number $K > 1$ of semi-classical control fields, wherein a Hamiltonian applied to the quantum system depends on the control fields, by means of a first sequence of control field settings, applying to the quantum system a first effective Hamiltonian ($H_{eff}$) having a matrix representation with an off-diagonal block corresponding to an input matrix A of shape $D_1 \times D_2$, and by means of a second sequence of control field settings, applying to the quantum system a second effective Hamiltonian (Z) having a matrix representation of the form $Z = I_1 - I_2$ where $$I_1 = \sum_{j=1}^{J} |l_j\rangle\langle l_j|_1,$$

and $$I_2 = I_2 = \sum_{j=1}^{J} |r_j\rangle\langle r_j|_1,$$

such that the second effective Hamiltonian induces a phase rotation in two dimensional subspaces spanned by two computational Hilbert space vectors, where one of the vectors is taken from the first subspace and the other is taken from the second subspace, the method further comprising the steps:

(a) applying the second effective Hamiltonian Z for a first phase rotation time corresponding to a phase rotation by a first angle ($\Phi_1$) then (b) applying the first effective Hamiltonian $H_{eff}$ for a first time $t_1$, and then (c) applying again the second Hamiltonian Z for a phase rotation time corresponding to a phase rotation by the negative of the first angle or applying the negative of the second Hamiltonian for the first phase rotation time, thereby effecting a unitary transformation $e^{-iG_{\Phi 1}t_1}:=e^{i\Phi_1 Z} e^{-i\,Heff\,t_1} e^{-i\Phi 1 Z}$, wherein the steps a-c are repeated for a second, third and so on up to a L-th angle $\Phi_L$ and a second, third and so on up to a L-th time $t_L$ thereby effecting a unitary transformation $U_{HOSVT} = e^{-iG_{\Phi L}t_L} e^{-iG_{\Phi L-1}t_{L-1}} \ldots e^{-iG_{\Phi 1}t_1}$, carrying out an optimization of the first, second third and so on rotation angles $\Phi_L$ and times $t_L$ in a classical preprocessing step, wherein the classical preprocessing step comprises a neural network, in particular a generative neural network, wherein the optimization involves a gradient descent on weights of the neural network, wherein the optimization involves feeding the function f(A) or its singular value decomposition to an input layer of the neural network.

4. The method of claim 3, wherein the preprocessing step is carried out by a classical control system of the quantum computing device.

* * * * *